United States Patent [19]

Smith

[11] Patent Number: 5,320,896

[45] Date of Patent: Jun. 14, 1994

[54] FLEXIBLE GASKETING DEVICE FOR FOAM CONTROL IN CRASH PAD POUR MOLDS

[75] Inventor: Daniel D. Smith, Eliot, Me.

[73] Assignee: Davidson Textron Inc., Dover, N.H.

[21] Appl. No.: 65,372

[22] Filed: May 24, 1993

Related U.S. Application Data

[62] Division of Ser. No. 962,815, Oct. 19, 1992, Pat. No. 5,234,639.

[51] Int. Cl.$^5$ .............................. B32B 23/02
[52] U.S. Cl. ................... 428/192; 428/122; 428/156; 428/172; 428/174
[58] Field of Search .............. 428/174, 99, 120, 304.4, 428/318.4, 122, 52, 66, 156, 192, 172; 49/475.1

[56] References Cited

U.S. PATENT DOCUMENTS

| | | | |
|---|---|---|---|
| 4,303,728 | 12/1981 | Houdek et al. | 428/315 |
| 4,814,036 | 4/1989 | Hatch | 156/245 |
| 4,904,429 | 2/1990 | Takahashi et al. | 264/46.7 |
| 4,946,727 | 8/1990 | Kessler | 428/99 |
| 4,952,351 | 8/1990 | Parker et al. | 264/46.4 |
| 4,968,465 | 11/1990 | Rhodes, Jr. | 264/46.5 |
| 4,973,235 | 11/1990 | Shoji | 425/4 |
| 5,026,452 | 6/1991 | Kodai | 156/293 |
| 5,071,605 | 12/1991 | Kawaguchi et al. | 264/45.2 |
| 5,098,271 | 3/1992 | Yanagashita | 425/117 |

FOREIGN PATENT DOCUMENTS

| | | | |
|---|---|---|---|
| 56-118830 | 9/1981 | Japan | 264/46.5 |
| 57-059731 | 4/1982 | Japan | 264/46.5 |
| 60-34812 | 2/1985 | Japan | 264/46.5 |
| 2091627 | 8/1982 | United Kingdom | 264/46.5 |

Primary Examiner—Donald J. Loney
Attorney, Agent, or Firm—Reising, Ethington, Barnard, Perry & Milton

[57] ABSTRACT

A gasketing device for forming a molded interior trim component for a vehicle utilizes a flexible planar gasket compressed between mold halves to prevent foaming material from entering the gasket area. The gasket is adapted to be secured to a structural insert and has a flexible peripheral edge that seals against the inside surface of a bezel on the insert. The gasket extends through the opening defined by the bezel to seal against a skin shell. The method includes mounting the gasket on the insert. The insert and gasket are placed on a mold half with an opposing mold half having a skin shell thereon. A foaming formulation is placed between the skin shell and insert and allowed to foam about the gasket to secure the insert to the skin shell. The product is removed, the skin shell over the gasket cut and peeled away to form an opening in the shell dimensioned smaller than the dimensions of the peripheral edge of the gasket. The gasket is accessed by hand through the smaller opening, is flexed to clear the edges of the smaller opening to prevent damage thereto and removed for reuse.

6 Claims, 3 Drawing Sheets

FLEXIBLE GASKETING DEVICE FOR FOAM CONTROL IN CRASH PAD POUR MOLDS

This is a divisional of application Ser. No. 07/962,815, filed an Oct. 17, 1992 now U.S. Pat. No. 5,234,639.

TECHNICAL FIELD

The invention relates generally to a gasketing device and a method for molding foam products such as automotive crash pads or instrument panels, and more particularly, to a gasketing device and a method for molding such products to minimize waste material.

BACKGROUND OF THE INVENTION

In the past, preformed vinyl skin shells of a synthetic resin material, such as polyvinyl chloride resin, have served as the outer surface of finished products. The vinyl skin covers the entire inner surface of the typical open pour-type mold cavity section, in order to keep molds clean after removal of the molded products. The entire skin shell is then covered by pouring an expanding urethane foam formulation thereon. A mold lid is placed on the mold cavity section. Typically, it supports an insert member that backs the skin shell in spaced relationship therewith. The urethane foam is spread between the skin shell and insert to bond them together. Thereafter, particular sections of the vinyl shell and any adjacent foam must be cut out or trimmed at openings in the insert that define required openings in the finished products for various associated add-on components, e.g., radio speaker, odometer, etc., in automotive instrument panels. Such cutouts or trim constitute waste sections.

In order to block out flow of an expensive foam formulation at a particular waste section between the skin shell and the insert, lower cost precast rigid foam blocks are sometimes used to fill cavities in the pour mold for the instrument panel insert. These rigid foam blocks are used as fillers to displace any foam that would travel into the waste sections during the final pour stage in the manufacture of a finished product such as an instrument panel. After foaming and removal of the final product, the skin is cut and the rigid foam blocks are removed and discarded.

U.S. Pat. No. 4,968,465, issued Nov. 6, 1990 to Rhodes, Jr. discloses another method of containing foam during molding of a foam-filled product. The patent discloses a mold assembly for molding vinyl skin shelled covered and foam filled products wherein waste portions or the shell and foam are eliminated from }he molded product. Compressible foam or silicone rubber gaskets or spacers of predetermined shape, such as the shape of an opening suitable for a radio speaker, are placed on a skin shell in the mold and compressed between the mold lid and the bottom surface of the mold cavity. The gasket is generally cylindrical. An insert is attached to the upper lid mold half and a vinyl skin is placed on the lower mold half. The gasket is placed on the lower mold half on end in an opening of the skin. The foam is poured and thereafter the mold is closed. After foaming, the gasket is removed. The gaskets of the '465 patent do not provide a peripheral edge for sealing around an extended length bezel surrounding large area openings for instrument clusters and the like.

At the present time, a seal arrangement of paper, tape, foam tape, and a large piece of cardboard is used to plug and seal such bezels and instrument cluster area openings in the instrument panel. Such a sealing arrangement requires substantial installation time. Moreover, it may tear so as to allow foam to leak into a large waste section cavity within the pour mold, created by the shell on the outer surface of cavity of the pour tool and the insert and lid surface of the pour tool creating the upper surface of the cavity. The foam leakage can, in some cases, constitute a substantial percentage of the total foam pour. As a consequence, voids or fatty foam can occur in the instrument panel behind the skin.

SUMMARY OF THE INVENTION

The invention is a gasketing device and a method for forming a molded product such that a predetermined quantity of foaming formulation is sealed against leakage into a large cavity waste section formed between a skin shell and an insert of the molded product.

The gasketing device of the present invention includes a unitary flexible member having a peripheral sealing edge adapted to flexibly engage the inside surface of a bezel surrounding an instrument cluster opening through an insert. The unitary flexible member has a plate portion that covers the instrument cluster opening inwardly of the peripheral sealing edge. The plate portion includes an inner recessed central portion raised with respect to spaced end portions; and the plate portion includes a raised surface at the periphery thereof engageable with a skin shell to prevent foam leakage between the plate portion and the skin shell.

The method includes the steps of placing a flexible gasket having a generally planar predefined shape in an opening of a backing insert, placing the insert and gasket on a complimentary surface of a first mold half adjacent a planar portion thereof, placing a continuous skin shell in a second mold half of complimentary configuration to the first mold half and on a planar portion thereof, pouring an expandable foam formulation onto the vinyl skin in the mold half, closing the mold halves so as to compress the flexible gasket between the first and second mold halves at the planar portions to prevent the expandable foam formulation from filling the space occupied by the flexible gasket expanding the foam formulation to adhere the skin shell to the backing insert separating the mold halves, removing the adhered backing insert and foam and skin combination from the mold half, cutting and removing the skin shell adjacent the flexible gasket from the remaining combination, and flexing and removing the flexible gasket from the insert and skin shell for reuse.

A further feature of the method is to remove the shell at an opening with edges dimensioned less than the dimensions of the gasket edge and flexing the larger dimensioned gasket to clear the foamed shell at such opening so as to prevent damage to the foamed shell.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
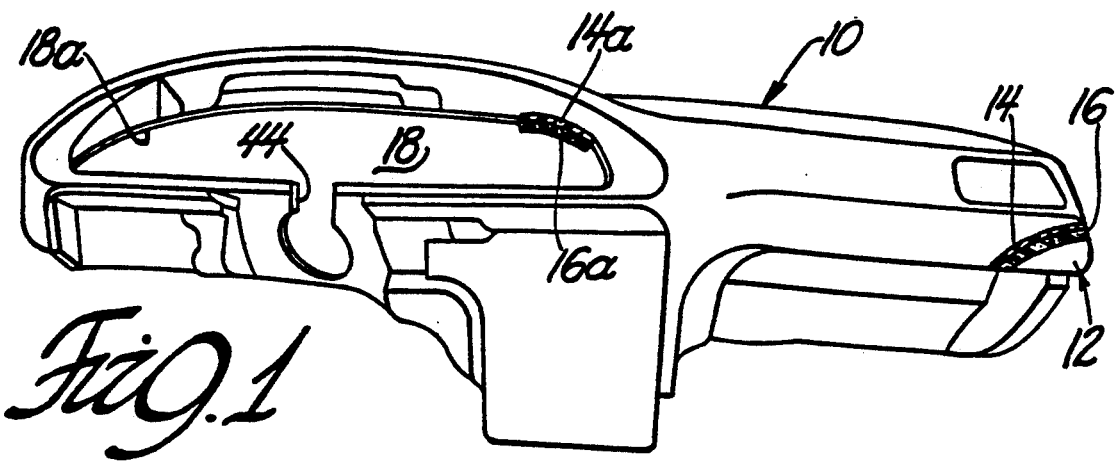
FIG. 1 is a perspective view of a final product produced by the subject invention.

Referring now to the drawings, FIG. 1 illustrates an automotive crash pad or instrument panel 10 comprising a backing insert 12 molded with a skin shell 14 having a foamed material 16 therebetween adhering all to one another. The molded product or panel 10 includes an opening 18 formed therein for receiving an instrument cluster subsequent to the described molding process. The opening 18 has a soft bezel 18a formed thereon including a reversely bent skin portion 14a and foam 16a.

As illustrated in FIGS. 2 and 4-6, a backing insert 12 is formed of a structural material, such as acrylonitrile/-butadiene/styrene, styrene maleic anhydride, polyphenylene oxide, or other suitable high strength plastic materials for providing a support structure of the instrument panel 10 to be secured to an automotive frame. The insert 12 provides an interconnected structural frame and ribs 20 providing an opening 22 therethrough for placement of accessories such as an instrument cluster.

Figure 2:
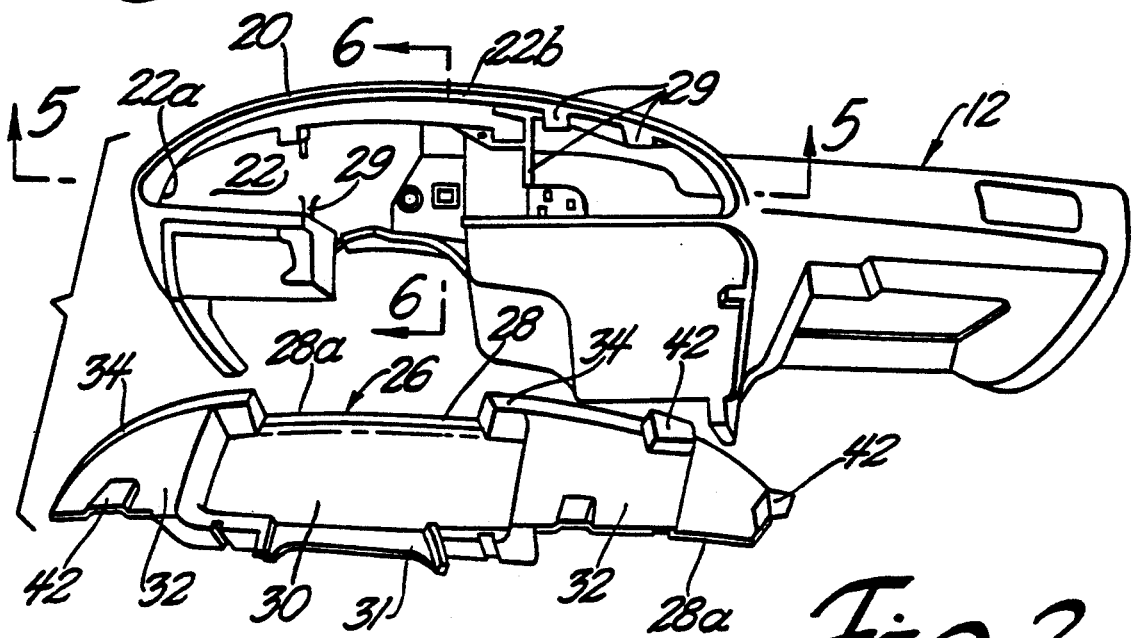
FIG. 2 is a perspective view of the insert and flexible gasket.
Figure 3:
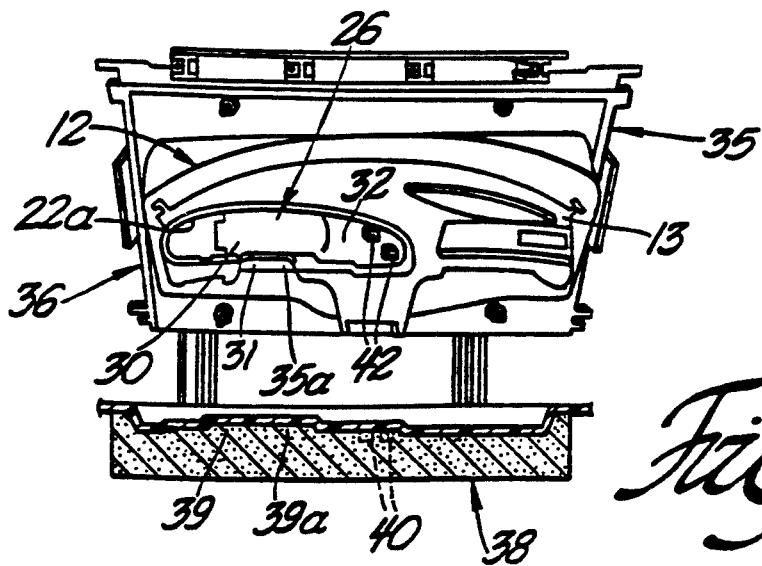
FIG. 3 is a cross sectional and perspective view of the mold assembly in the open position containing the insert, gasket and skin.
Figure 4:
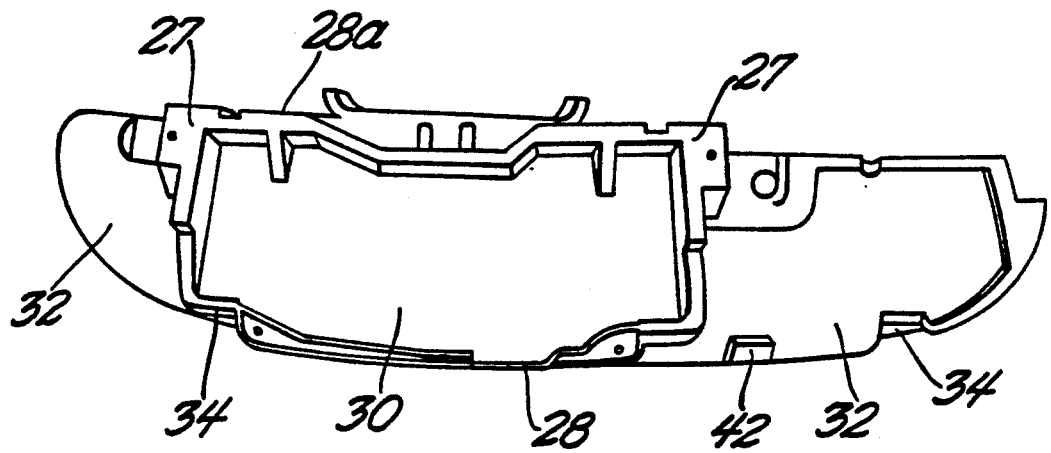
FIG. 4 is a top elevation view of the flexible gasket.

A flexible gasketing device 26, as shown in FIGS. 2 and 3, is inserted in the opening 22 to prevent the escape of foam 16 through the opening 22. The flexible gasket device 26 may be made of a rubber silicone such as high temperature silicone reinforced material that is sold by Presray Co., G.E. silicone, Dow silicones. Other suitable gasket materials include polyurethanes such as Ciba-Geigy RP6410 and I.T.W. Devon Flexane 80 (100% flexadd added). In accordance with one aspect of the invention, the flexible gasketing device 26 has a plate portion 28 generally planar in shape having a flexible sealing edge 28a that is sealingly engaged to the inside surface 22a of opening 22 at a bezel 22b formed therearound. The gasketing device 26 has a planar recessed central portion 30 and spaced, wing shaped ends 32. The perimeter of the flexible gasketing device 26 is semi-oval in shape as is the shape of the bezel or cluster area of a vehicle. The flexible gasketing device 26 further includes a raised surface 34 on the wing shaped ends 32. The backing insert 12 includes flanges 29 for structural rigidity and for attachment of the instrument cluster to the crash pad or for attachment of the crash pad to the firewall of a vehicle.

Figure 5:
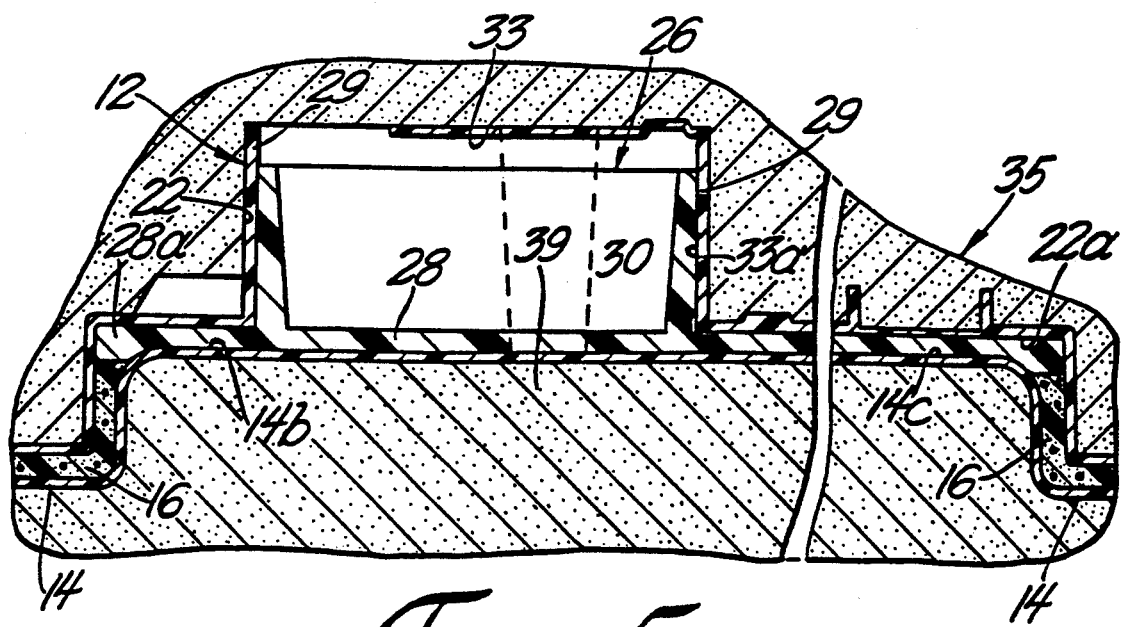
FIG. 5 is an enlarged fragmentary cross sectional view of the closed mold following foaming taken along the line 5—5 of FIG. 2, looking in the direction of the arrows.
Figure 6:
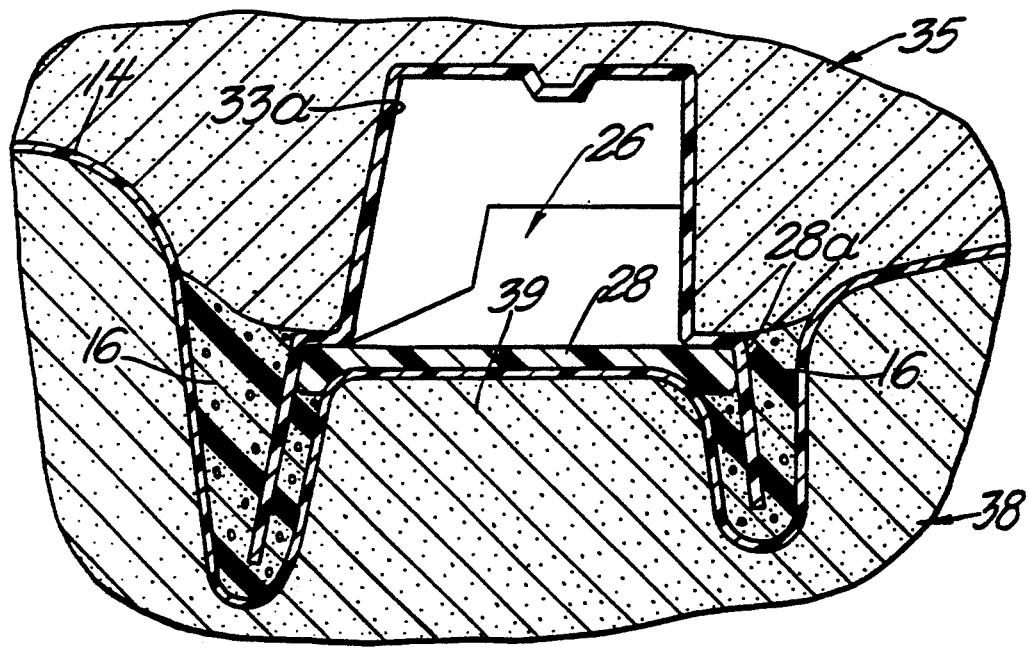
FIG. 6 is an enlarged fragmentary cross sectional view of the closed mold following foaming taken along the line 6—6 of FIG. 2.

As illustrated in FIG. 3, the insert 12 with the gasketing device 26 secured thereto is fixedly secured to a first or upper mold half 35 of a mold 36 having a surface of complimentary configuration to the insert 12 and gasketing device 26 combination. The side portion 31 seals against a surface boss 35a on the upper mold half 35. The upper mold half 35 includes a planar portion 33 with a planar recess 33a adjacent the planar recessed central portion 30 of the gasketing device 26 (FIG. 5). The insert 12 is temporarily supported in any convenient manner on the upper mold half 35 such as by detachable pins or the like (not shown).

The continuous skin shell 14 is placed in a second or lower mold half 38 of complimentary configuration of the front surface 13 of the insert 12 and first mold half 35. The continuous skin shell 14 may be of a polyvinyl chloride material, as commonly used in trim components of automobile interiors. The skin shell 14 forms to the mold half 38 configuration. The lower mold half 38 includes a raised stepped planar portion 39 of shape complimenting the shape of the gasketing device 26 at the recessed central portion 30 and wing shaped ends 32.

The expandable foam formulation 16 (FIGS. 5 and 6) is poured onto the vinyl skin shell 14 in the lower mold half 38 prior to or after closing of the mold halves 35, 38 and about but excluding the skin shell 14 located on the raised planar portion 39. If the foam formulations 16 is poured after closure, the mold 36 will include an opening formed in the upper mold half 34, as commonly known in the art.

The mold halves 35, 38 are closed so as to position the flexible gasketing device 26 between the first and second mold halves 35, 38 such that the central portion 30 of the flexible gasketing device 26 fits over and around a rectangularly shaped segment 39a of the raised planar portion 39 as seen in FIG. 3. The raised surface 34 also is thereby pressed in sealing engagement with surfaces 14b and 14c of the skin 14 to prevent the expandable foam formulation from filling the space occupied by the flexible gasketing device 26 along the insert 12. The insert 12 and mold half 38 include recesses 40 as seen in FIG. 3 into which locator foot portions 42 on flexible gasketing device 26 fit. The flexible gasketing device 26 is compressed between the top half mold 34 and the lower half mold 38 to prevent seepage of the foam 16 in the protected area. The foam 16 is allowed to expand in the surrounding area to adhere the skin shell 14 to the backing insert 12.

After foaming, the mold halves 34, 38 are separated and the trim panel 10 removed therefrom. The trim panel 10 includes the adhered backing insert 12, foam 16, gasketing device 26 and skin shell 14 combination.

Figure 7:
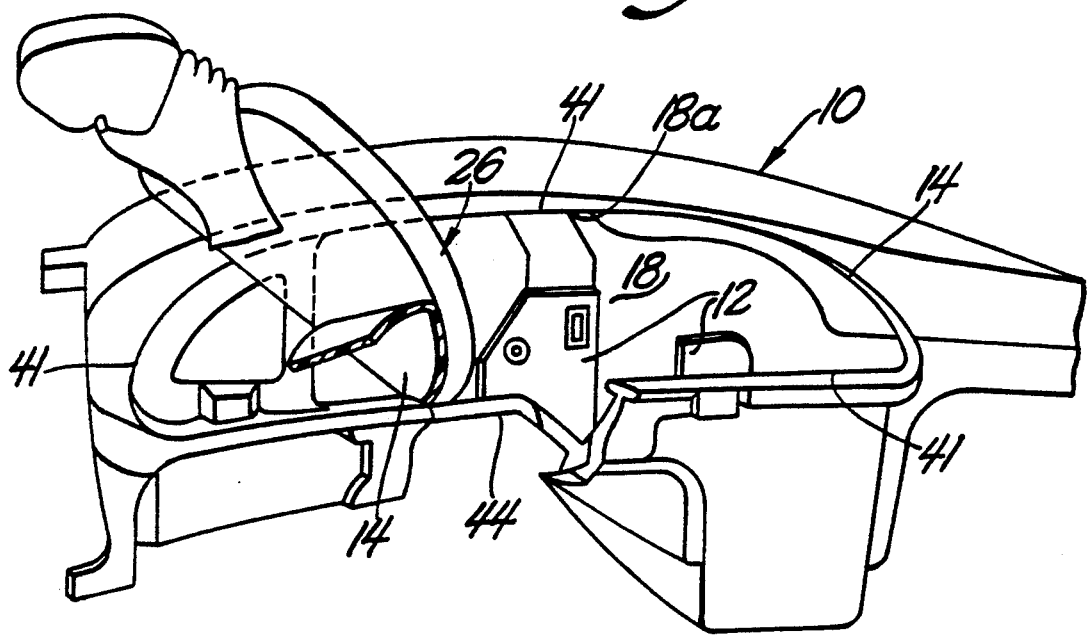
FIG. 7 is a perspective view of the final product with the skin cut away and the gasket partially removed.

As illustrated in FIG. 7, an area of the skin shell 14 is cut over and about the flexible gasket device 26 along line 41 and removed therefrom with the remaining skin in place over the foam 16 and insert 12. The skin shell 14 may be easily removed therefrom since there is no adhering material between the shell 14 and gasketing device 26. In accordance with the invention, the line 41 circumscribes an oval opening with dimensions less than the dimensions of the outer perimeter of the gasketing device 26.

Accordingly, the flexible gasketing device 26 is flexed and bent inwardly of the line 41 for removal from the flanges 29 of the insert 12 leaving the opening 18 (FIG. 1). As seen in FIG. 7, the shell 14 and foam 16 project over the cluster opening 18 approximately one-half inch. The overlap extends all the way around the bezel 18a and, in order to avoid damage at the edges, the gasketing device 26 is sufficiently flexible so that it can be squeezed inwardly to clear the edges of the shell 14 and foam at the bezel 18a. When the gasketing device 26 is removed, it leaves an opening 44 through which a steering column is located. The flexible gasketing device 26 may be reused in a similar manner.

A minimal amount of foam formulation 16 is required since the space being filled by the expanding foam formulation is the exact shape required by the finished product 10. Hence, there is no need to cut out or trim away any waste foam after the product is removed from the mold 36.

The foam formulation 16 includes suitable adhering material to ensure adhesion of the foam to the vinyl skin and backing insert. Such foam formulation 16 may include MDI Base Senereyed Polyurethane, Miles Bayfill System 3, Davidson Textron systems such as DMC 108 or other available off the shelf systems by Dow BASF and other urethane foam manufacturers. The gasketing device 26 can be covered by a suitable release agent to separate from the foam at the seal interface therebetween during the removable thereof shown in FIG. 7.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A gasketing device for sealing an opening defined by a bezel portion located in an insert member which is to be molded into an instrument panel using an expandable foam formulation, said gasketing device comprising a unitary flexible member having a plate portion, said plate portion being generally planar in shape and having a recessed central portion, said central portion having a pair of wing-shaped ends extending laterally outwardly in opposed directions from said recessed central portion, said central portion and said pair of ends being formed with an outer edge, and said outer edge of said central portion and of said wing-shaped ends adapted to sealingly engage said bezel portion of said insert member so as to prevent escape of said foam formulation through said opening in said insert member during the molding of the instrument panel.

2. A manually removable and reusable gasketing device for sealing an oval shaped opening defined by a bezel portion located in an insert member which is to be molded into an instrument panel using an expandable foam formulation combined with a skin shell, said gasketing device comprising a unitary flexible member having a plate portion, said plate portion being generally planar in shape and having a recessed central portion, said central portion having a pair of wing-shaped ends extending laterally outwardly in opposed directions from said recessed central portion, said central portion and said pair of ends being formed with a peripheral edge, and said peripheral edge of said central portion and of said wing-shaped ends being curved and adapted to sealingly engage said bezel portion of said insert member so as to prevent escape of said foam formulation through said opening in said insert member during the molding of the instrument panel.

3. The gasketing device set forth in claim 2 wherein said central portion of said plate portion is formed with a side extension for sealing against a part of the mold used in forming the instrument panel so as to provide an opening for a steering column.

4. The gasketing device set forth in claim 2 wherein said flexible member is formed with locator foot portions on said pair of wing-shaped ends adapted to be received by recesses formed in the mold during the molding of the instrument panel.

5. The gasketing device set forth in claim 2 wherein said flexible member is made of a rubber silicone material.

6. The gasketing device set forth in claim 5 wherein said locator foot portions are integrally formed with said pair of wing-shaped ends the flexible member adjacent the peripheral edge thereof.

* * * * *